July 10, 1928.
C. B. ULRICH
1,676,810
POSTING BUS OR TRUCK
Filed April 23, 1926    2 Sheets-Sheet 1
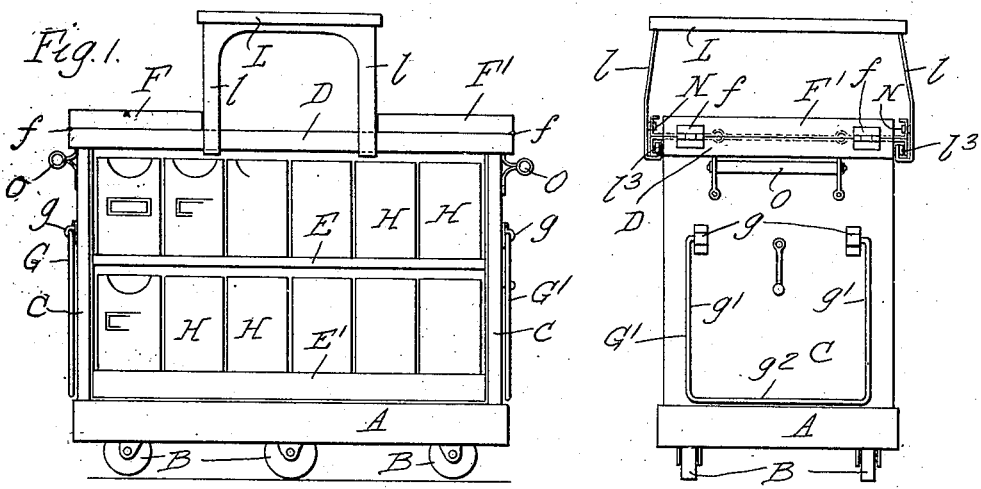
INVENTOR
Charles B. Ulrich
By Parker & Prochnow
ATTORNEYS.

July 10, 1928.
C. B. ULRICH
1,676,810
POSTING BUS OR TRUCK
Filed April 23, 1926
2 Sheets-Sheet 2
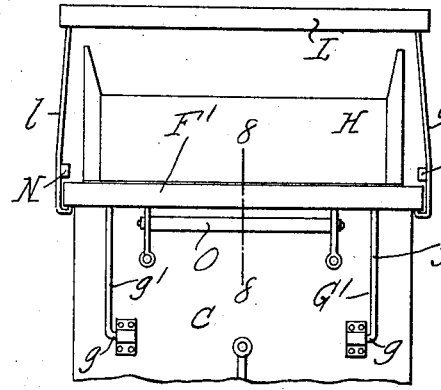
Fig. 7.
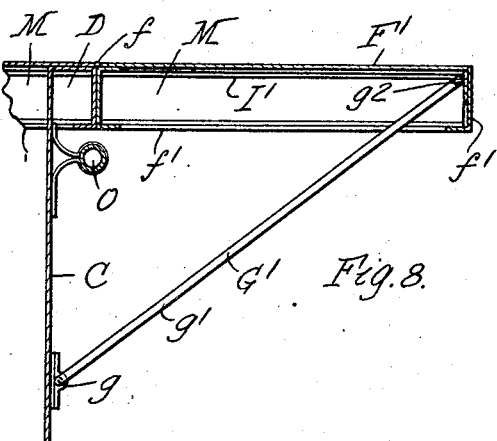
Fig. 8.
Fig. 9.
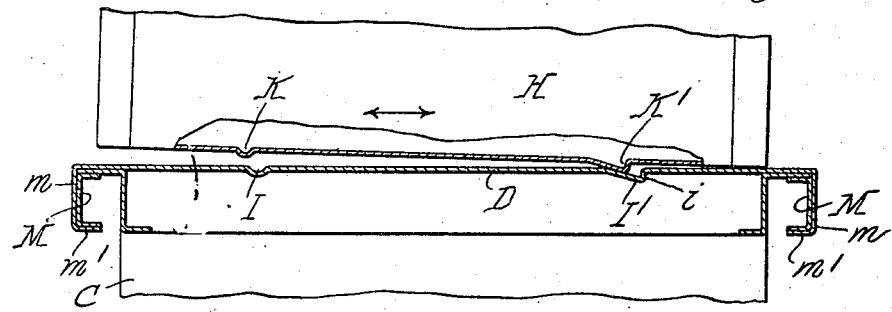
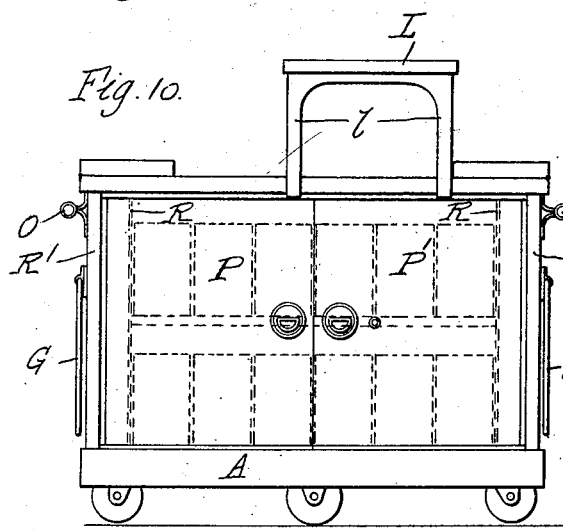
Fig. 10.
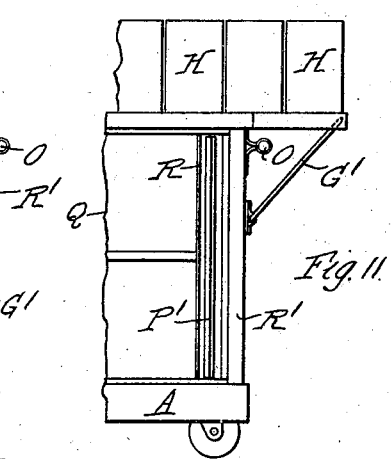
Fig. 11.
INVENTOR
Charles B. Ulrich,
By Parker & Prochnow
ATTORNEYS.

Patented July 10, 1928.

1,676,810

UNITED STATES PATENT OFFICE.

CHARLES B. ULRICH, OF JAMESTOWN, NEW YORK, ASSIGNOR TO ART METAL CONSTRUCTION COMPANY, OF JAMESTOWN, NEW YORK.

POSTING BUS OR TRUCK.

Application filed April 23, 1926. Serial No. 104,111.

Heretofore the record cards of banks or other business houses having a large number of accounts were kept in trays, which in turn were supported on a relatively stationary desk or table located in a position convenient for the making of entries on the cards, and the records were either left on the desks or tables after the close of business, or they were loaded on a bus or truck and transported to a vault.

The objects of this invention are to provide a bus or truck which is provided with an extensible top on which the trays may be supported, so that the record cards therein are accessible for use, and with a compact storage space below said top in which the records can be housed when not in use, the extensible top being adapted to accommodate substantially all the trays that can be contained in said storage space; also to provide a bus or truck of this kind having a top which may be collapsed or folded when not in use and which does not, when collapsed, restrict the storage space of the bus, so that the bus or truck occupies a comparatively small space and can consequently easily be moved into a vault or safe storage room; also to provide a bus or truck of this kind in which the extensions of the top may be folded in such a manner as to limit the movement of a posting board movable over the top of the bus and prevent accidental removal or displacement of the same; also to provide a bus or truck of this kind with means of improved construction for holding the trays in their operative positions on the top or shelves of the bus, and to facilitate the positioning of the trays on and their removal from the top or shelves; also to provide a bus or truck of this kind with means of improved construction for permitting the folding of the top and for holding the folding portions thereof in their operative positions; also to improve the construction of portable desks or tables of this kind in other respects hereinafter specified.

In the accompanying drawings,

Fig. 1 is a front elevation of a bus or truck showing the parts thereof in folded or compact position.

Fig. 2 is a side elevation thereof.

Fig. 3 is a front elevation thereof showing the parts of the device in their operative positions and showing the card trays arranged on the top thereof, a plurality of trays, ready for use.

Fig. 4 is a top plan view thereof.

Fig. 5 is a sectional elevation thereof on line 5—5, Fig. 3.

Fig. 6 is a fragmentary, enlarged, sectional elevation thereof on line 6—6, Fig. 3.

Fig. 7 is a fragmentary, side view thereof, showing the parts on the position shown in Fig. 3.

Fig. 8 is a fragmentary, sectional view thereof, on an enlarged scale, on line 8—8, Fig. 7.

Fig. 9 is a sectional view thereof crosswise of the top of the device showing one of the card trays ready to be positioned thereon or removed from the top.

Fig. 10 is a front elevation of a bus or truck of slightly modified construction.

Fig. 11 is a fragmentary front elevation thereof showing the device ready for use.

The portable bus or truck in the particular embodiment of the invention shown in the drawings, includes a base A of any suitable or desired construction having a series of casters B secured thereon. These casters may also be of usual or desired construction, for example, of a construction heretofore used for busses of other types. C represents the opposite side walls of the bus which extend upwardly from the base A and to the upper end of which a top D is secured. E represents a shelf arranged substantially half way between the table top D and a lower shelf or filler E' secured to the base A, and the two shelves E and E' are preferably also secured at their ends to the upright side or end walls C.

The bus top D is provided at its opposite sides with shelves or extensions F, F', which are suitably hinged to the sides of the top D, for example by means of hinges f, so that the shelves or extensions F, F' may be supported in their operative or extended positions as shown in Fig. 3 in which the upper surfaces of the extensions form substantially continuations of the upper surface of the top D, and in inoperative positions as shown in Fig. 1, in which the extensions fold or swing to lie on the upper surface of the top D. In order to support the extensions in their extended or operative positions, a pair of supports or braces G, G' are preferably employed which may be of any suitable or desired construction and which are preferably hinged at $g$ on the side walls C, and the outer or free ends of the braces engage the extensions F, F' as shown in Fig. 3 to hold the same in their operative positions and to help support the loads carried thereby. In the particular embodiment of the invention shown, these shelf supports are in the form of U-shaped rods or tubes including legs $g'$ connected by cross bars or parts $g^2$, which are adapted to lie against the under faces of the extensions near the outer edges thereof to support the extensions throughout its width. The extensions F and F' are preferably provided at their edges with downwardly extending flanges $f'$ which may be secured thereto or formed integral therewith, and the braces are intended to engage the under faces of the extensions at the juncture of the flanges $f'$ and the tops of the extensions, so that the flanges hold the braces in their operative positions.

H represents the trays in which the record cards are contained, and these trays may be of any suitable or desired construction to adapt them to support the record cards in such a manner that they are readily accessible and removable from the trays. These trays may be supported on the shelves E, E' when not in use, as shown in Fig. 1, and when entries are to be made on the record cards, the trays containing the cards are placed upon the top D and extensions F, F' thereof so that all of the cards contained in the trays are readily accessible. An extra tray is usually provided, as shown in Fig. 3 which may remain on one of the shelves below the table top and which contains blank cards.

In order to facilitate the positioning of the card trays on a top D, and on the shelves E, E', below the top, the trays are provided with parts adapted to interfit with corresponding parts on the top and extensions or upon the shelf below the top. Any suitable interfitting connections between these parts may be provided. In the particular construction shown, the top and extensions are provided with grooves I, I' extending lengthwise of the top and the extensions thereof, and similar grooves I² and I³ are provided in the shelves E, E'. The grooves I, I², which are located nearest to the front of the bus or truck, are preferably rounded in cross section, and the grooves I' and I³, which are nearer the rear of the bus or truck, are provided at their near edges with abrupt shoulders $i$. The several trays are provided on their bottom surfaces with downwardly extending projections K, K' which are so shaped as to fit into the depressions I, I' on the top, and into the corresponding depressions on the shelves. In the particular construction shown, these projections on the bottoms of the trays are in the form of integral ribs or lugs, but it will be understood that these projections may be formed of separate pieces of material secured to the bottoms of the trays H. The shouldered portions of the projections K' of the trays are adapted to engage against the shouldered portions $i$ of the top or shelves to form stops to limit rearward movement of the trays on the top or shelves so that a positive positioning of the trays is insured. Furthermore, the inclined portions of the grooves I' and I³ cooperate with the projections K' of the trays, to cause the trays to slide rearwardly into their correct positions in case the trays are not pushed rearwardly quite far enough. When a tray is placed on the top D, or on one of the shelves, or removed therefrom, the front end of the tray is slightly raised as shown in Fig. 9, whereupon the rear groove or projection K' may be readily slid into or out of the groove I' or I³. When the front end of the tray is lowered, after the tray has been positioned on the table or a shelf, the projection K will seat in the groove I or I² so that the tray will be held against accidental displacement. The correct positioning of the trays on the shelves or table top is greatly facilitated by the provision of the grooves and projections described.

In order to facilitate the making of entries on the various record cards or the doing of any other work in connection with the record cards, a posting board is preferably provided which is movable over the top and extensions of the bus and over the card supporting trays positioned thereon. This posting board may be of any suitable or desired construction, that shown in the drawings including a top L which may be of any suitable or desired form, being preferably finished like a desk top. The posting board is provided at its front and rear ends with downwardly extending legs or supports $l$, the upper ends of which are rigidly secured to the top plate L and the lower ends of which are so connected with the bus top D that the posting board may be shifted lengthwise of the bus top and extensions thereof. In the particular construction shown, see particularly Fig. 6, the lower ends of the legs $l$ are bent inwardly and upwardly as shown at $l'$ and $l^2$ respectively, and a roller or wheel $l^3$ is pivoted on the upward extension $l^2$ of each leg of the posting board. The front and rear edges of the bus top D are bent first downwardly as shown at $m$, and then inwardly, as shown at $m'$, so that the inwardly extending edges $m'$ of the front and rear edges of the bus top may support the wheels or rollers $l^3$. If desired, a channel shaped reinforcing member M may be secured to the inner face of the inturned edges of the bus top which reinforces the edge and forms a track support for the wheels or rollers $l^3$. The edges $f'$ of the extensions F, F' are similarly formed at their front and rear edges so that when these extensions are in their operative positions as shown in Fig. 3, the rollers or wheels $l^3$ will be similarly supported on the extensions of the bus top as on the top itself. The dotted lines in Fig. 3 indicate the extreme positions of the posting board, and the flanges $f'$ at the ends of the extensions F, F' serve to prevent the wheels or rollers $l^3$ from passing beyond the ends of the extensions.

Means are preferably also provided for preventing the posting board from moving beyond the ends of the bus top D when the extensions F, F' are in their folded positions as shown in Fig. 1. In the particular construction shown for this purpose, stops N are suitably secured to legs $l$ of the posting board, as shown in Figs. 2, 6 and 7, and when the extensions F, F' are folded on top of the bus top D, these stops N will engage the edges of the extensions F, F' and thus limit the movement of the posting board and prevent the same from moving beyond the ends of the bus top D.

O represents handles secured to the opposite side walls C of the bus or truck to facilitate the moving of the same from one position to another.

In the modified construction shown in Figs. 10 and 11, the space between the bus top and base is enclosed so as to protect the card trays when supported on the shelves below the table top. In the particular construction shown for this purpose, a pair of doors P, P' are provided to enclose the front of this space. The back of the shelf space is enclosed by means of a rear wall Q, and both the rear wall and the doors, as well as the other walls surrounding the card trays, are preferably made fire resisting and may, if desired, be lined with asbestos (not shown).

The doors P, P' may be of any suitable or desired construction, but are preferably made to nest adjacent to the side walls of the bus or truck when not in use, and for this purpose the upper shelf is supported by inner partition walls R, which are spaced from the outer end walls R', forming a space in which the doors may be housed when not in use. A bus or truck of this kind offers sufficient protection to the records stored therein so that the bus need not be housed in a vault or safe storage room when not in use, and at the same time, the bus is readily portable so that it can be moved into any position convenient for inspection of or posting on the record cards. In other respects the construction shown in Figs. 10 and 11 is substantially similar to that which has already been described. In both of the constructions shown, the records contained in the trays will, when the trays are supported on the shelves, be securely protected from damage such as might be caused by falling articles or parts of a building in case of fire, since the bus top D is of rigid and strong construction. By means of the construction described, the trays containing the record cards are housed in a compact space, so that the bus or truck, when not in use, occupies the minimum of space.

I claim as my invention:—

1. A bus adapted to support a plurality of trays containing record cards, said bus including a top and storage space for trays below said top, and an extension which is adapted to form a continuation of and increase the supporting area of said top when in its operative position and which is adapted to be moved into an inoperative position to reduce the length of the bus, said top and extension being adapted to support substantially all of the trays contained in said storage space to render the cards contained in said trays accessible, said top and extension having guides alined when said extension is in its said operative position, and a posting board supported and guided by said guides in movements over said top and its extension.

2. A posting bus for supporting a plurality of trays containing record cards, said posting bus having a top and side walls arranged to form a storage space for trays between said side walls and below said top, extensions at opposite sides of said top which in their extended positions form with said top a support for substantially all the trays contained in said storage space, and a posting board which is movable along said top and extensions, and which extends over the trays supported on said top and extensions, said extensions being movable into inoperative positions to reduce the length of said top.

3. A posting bus for supporting a plurality of trays containing record cards, said posting bus having a top and side walls arranged to form a storage space for trays between said side walls and below said top, extensions at opposite sides of said top which in their extended positions form with said top a support for substantially all the trays contained in said storage space, and a posting board which is movable along said top and extensions, and which extends over the trays supported on said top and extensions, said extensions being pivoted to swing into positions over said top to limit the movement of said posting board relatively to said top.

4. A posting bus having a top provided beneath the same with space for storage of trays containing record cards, extensions movably secured at opposite ends to said top and adapted to be moved into operative positions to form continuations of said top, the top and extensions being adapted to support most of the trays contained in said storage space, a posting board movable lengthwise of said top and extensions thereof, and means for swinging said extensions into inoperative positions to limit the movement of said posting board relatively to said top.

5. A posting bus having a top provided beneath the same with space for storage of trays containing record cards, extensions movably secured at opposite ends to said top and adapted to be moved into operative positions to form continuations of said top, the top and extensions being adapted to support most of the trays contained in said storage space, a posting board movable lengthwise of said top and extensions thereof and including a part which straddles and extends over trays supported on said top, and parts engaging the edge portions of said top and extensions to permit said posting board to travel lengthwise of said top and extensions, and stops on said posting board adapted to engage said extensions when moved inwardly with reference to the ends of said top.

6. A posting bus having a top provided at opposite ends with extensions hinged to the top and adapted to swing outwardly to form continuations thereof and to swing inwardly and rest upon the upper surface of said top, said top and extensions being adapted to support record trays, a posting board movable over said top and extensions thereof and over record trays supported thereon and including legs extending in proximity to the edges of said top and extensions, the opposite edges of said top and extensions being turned inwardly toward each other to form guides for the legs of said posting board.

7. A posting bus having a top provided at opposite ends with extensions hinged to the top and adapted to swing outwardly to form continuations thereof and to swing inwardly and rest upon the upper surface of said top, said top and extensions being adapted to support record trays, a posting board movable over said top and extensions thereof and over record trays supported thereon and including legs extending in proximity to the edges of said top and extensions, the opposite edges of the top and extensions being turned downwardly and inwardly toward each other, the lower ends of the legs of said posting board having rollers adapted to roll on the inturned portions of the edges of said top and extensions.

8. A posting bus having a top provided at opposite ends with extensions hinged to the top and adapted to swing outwardly to form continuations thereof and to swing inwardly and rest upon the upper surface of said top, said top and extensions being adapted to support record trays, a posting board movable over said top and extensions thereof and over record trays supported thereon and including legs extending in proximity to the edges of said top and extensions, the opposite edges of the top and extensions being turned downwardly and inwardly toward each other, the lower ends of the legs of said posting board having rollers adapted to roll on the inturned portions of the edges of said top and extensions, and stops on said posting board adapted to engage said extensions when the same are swung inwardly above said top, to limit the movement of said posting board on said top.

9. A posting bus having a surface on which trays containing record cards may be supported, said tray supporting surface being provided with a groove, a plurality of trays each having a projection on its bottom adapted to enter said groove for correctly positioning said trays on said supporting surface, and a posting board mounted on the bus adjacent the side portions of said surface for movement along the bus over said surface.

10. A posting bus having a surface on which trays, containing record cards may be supported, said tray supporting surface being provided with grooves, a plurality of trays, projections on the bottoms of said trays adapted to enter said grooves for positioning the trays relatively to said supporting surface, one of said grooves being provided with a shoulder at its rear edge to limit the rearward movement of a tray relatively to the supporting surface, and a posting board mounted on the bus adjacent the side portions of said surface for movement along the bus over said surface.

11. A posting bus having a surface adapted to support trays containing record cards, said surface being provided with a pair of grooves extending lengthwise thereof, one of said grooves being provided with a face inclined downwardly and away from the front of said table and terminating in a shouldered portion, projections on said trays adapted to enter said grooves, whereby the inclined portion will tend to cause the trays to move into correct seating position with reference to said surface, and whereby said shouldered portion of the groove will limit the movement of said tray.

12. A posting bus having a top provided beneath the same with space for storage of trays containing record cards, extensions movably secured to said top to move into operative positions to form continuations of said top and into operative positions to reduce the size of said bus, a posting board movable over said top and extensions, and cooperating parts on said top and trays to facilitate the correct positioning of said trays on the top relatively to said posting board.

13. A posting bus having a top provided at opposite ends with extensions hinged to the top and adapted to swing outwardly to form continuations thereof and to swing inwardly and rest upon the upper surface of said top, said top and extensions being adapted to support record trays, a posting board movable over said top and extensions thereof and over record trays supported thereon and including legs extending in proximity to the edges of said top and extensions, the opposite edges of said top and extensions being provided with alined tracks for supporting and guiding the legs of said board in travel along the bus and over said extensions, the ends of the extensions when resting upon the upper surface of said top acting as stops to limit the movement of said board along the tracks.

CHARLES B. ULRICH.